CAPSTAN DRIVE COMPLEX FOR SOUND TAPE CARTRIDGES

Filed Feb. 14, 1967 2 Sheets-Sheet 1

INVENTOR.
JERRY O. KELLEY
BY [signature]
ATTORNEY

CAPSTAN DRIVE COMPLEX FOR SOUND TAPE CARTRIDGES

Filed Feb. 14, 1967 2 Sheets-Sheet 2

INVENTOR.
JERRY O. KELLEY

BY [signature]
ATTORNEY.

United States Patent Office 3,495,788
Patented Feb. 17, 1970

3,495,788

CAPSTAN DRIVE COMPLEX FOR SOUND TAPE CARTRIDGES

Jerry O. Kelley, Chicago, Ill., assignor to Cart-Trac, Inc., Chicago, Ill., a corporation of Illinois Filed Feb. 14, 1967, Ser. No. 616,124
Int. Cl. G03b 1/04
U.S. Cl. 242—200 22 Claims

ABSTRACT OF THE DISCLOSURE

According to the disclosures, the tape web is pulled in known manner from one reel by action of a capstan spindle and pinch roller, while the other reel is driven to take up the web through the intermediary of a peripheral or rim-to-rim driving interengagement between reversely-acting, unidirectionally responsive peripheral driving rotors in coaxial assembly with a capstan drive spindle, each reel being driven by a corresponding reel rotor forming part of the reeling assembly in the cartridge and having peripheral-drive means cooperatively interengaging in substantially tangential driving confrontation with the complementary peripheral-drive means of the corresponding capstan rotor when the cartridge is placed in driving juxtaposition with the capstan drive unit.

The invention provides a method and apparatus in the form of a multiplexed capstan drive assembly for travelling sound tape reversely between a pair of reels, particularly reels which are enclosed in a tape cartridge, in accordance with which economies in manufacture, as well as operational improvements, are effected as the result of simplification and elimination of cartridge parts.

The capstan complex may be embodied in a form in which a capstan spindle has arranged along its length two peripheral-drive capstan rotors spaced apart axially to provide a gap into which the pinch roller and tape web can enter into peripheral driving engagement with the portion of the spindle exposed in the gap, the pinch roller being journalled in the tape cartridge along with a pair of peripheral-drive reel rotors, respectively in form and location such that when the cartridge is pressed into operative juxtaposition and confrontation with the capstan unit, the pinch roller will enter the gap and engage the spindle, and each reel rotor will drivingly interengage with its corresponding capstan rotor, and the tape will travel and be taken up one way or the other according to the direction of rotation of the spindle.

Variantly, in the practice of the method the pinch roller and reel rotors may be journalled coaxially on one spindle within the cartridge, or they may be journalled on separate spindles; or the reel rotors may be journalled within the cartridge while the pinch roller is omitted as a part of the reeling assembly in the cartridge and mounted on movable spindle means forming part of the capstan drive means and adapted to enter and withdraw from the cartridge when seated in operative juxtaposition with such drive means.

Two types of tape transport are commonly employed: the reel-to-reel system in which the tape is wound onto one reel from another, usually in a reversible action so that multiple sound channels running in opposite directions on the tape may be transduced; and the other the continuous loop system in which the tape is taken off the inside of a single coil and restored on the outside thereof. Both systems are employed in tape cartridges, but the reel-to-reel operation is considered to have significant advantages over the continuous loop system in that, among other things, tape wear and breakage is considerably reduced and can be very nearly eliminated; very thin tape permitting more footage per reel can be used; and less driving power is required for the reeling operation.

In the reel-to-reel system certain problems become critical in the cartridge type of operation, because the mechanism for reversely driving the reels must be embodied in a very confined space which is almost entirely occupied by the reels themselves, and the mechanism must be effective to drive each of the two reels in alternation, depending upon the direction of rotation of the capstan spindle and pinch roller, so that one or the other of the reels is positively driven to take up the tape web payed out from the other depending upon the direction of tape travel; and in this type of operation differential pulls arise with corresponding differences in rate of rotation of the reels owing to the constantly changing diameters of the core of tape on each reel as one unwinds and the other winds in, it being recognized that this kind of action not only gives rise to breakage and damaging stresses on the tape, but seriously affects the quality of reproduction in the case of musical recordings.

In the case of open-reel or deck-type operation of the reel-to-reel systems where adequate space is available many of the problems which have made reliable cartridge operation difficult to achieve can be overcome by elaborately controlled reeling and driving equipment, an example of this type of apparatus being disclosed in British Patent No. 727,125 (1955) which provides reel spindles equipped with electromagnetic clutch mechanism and a motor drive spindle with reverse acting clutches driving a continuous pulley belt which in turn drives parts of both clutch mechanisms and a combination pinch roller and capstan spindle separate from the motor shaft and clutch means.

An example of a reel-to-reel cartridge of highly compact and simple construction is found in a copending application Ser. No. 354,477, now U.S. Letters Patent No. 3,348,786, which provides a built-in pinch roller including, in coaxial unit assembly therewith, reverse-acting clutch means and reel-driving pulleys separately and reversely driven thereby all within the confines of a small flat cartridge casing exposing the pinch roller for coaction with an external capstan spindle.

While the present disclosures are advantageously adaptable to open deck operation, they make reel-to-reel cartridge operation especially feasible because of improved sound quality and significantly reduced unit cost of the cartridges for the reason, among others, that the clutch means can be eliminated in each cartridge in one embodiment of the apparatus, and both the clutch means and the pinch roller and its spindle means can be eliminated in another form thereof, only one form of the capstan complex being required in either case.

Further and more detailed aspects of novelty and utility characterizing the invention will appear as the following description proceeds in view of the annexed drawings, in which.

Figures 1, 2, 3:
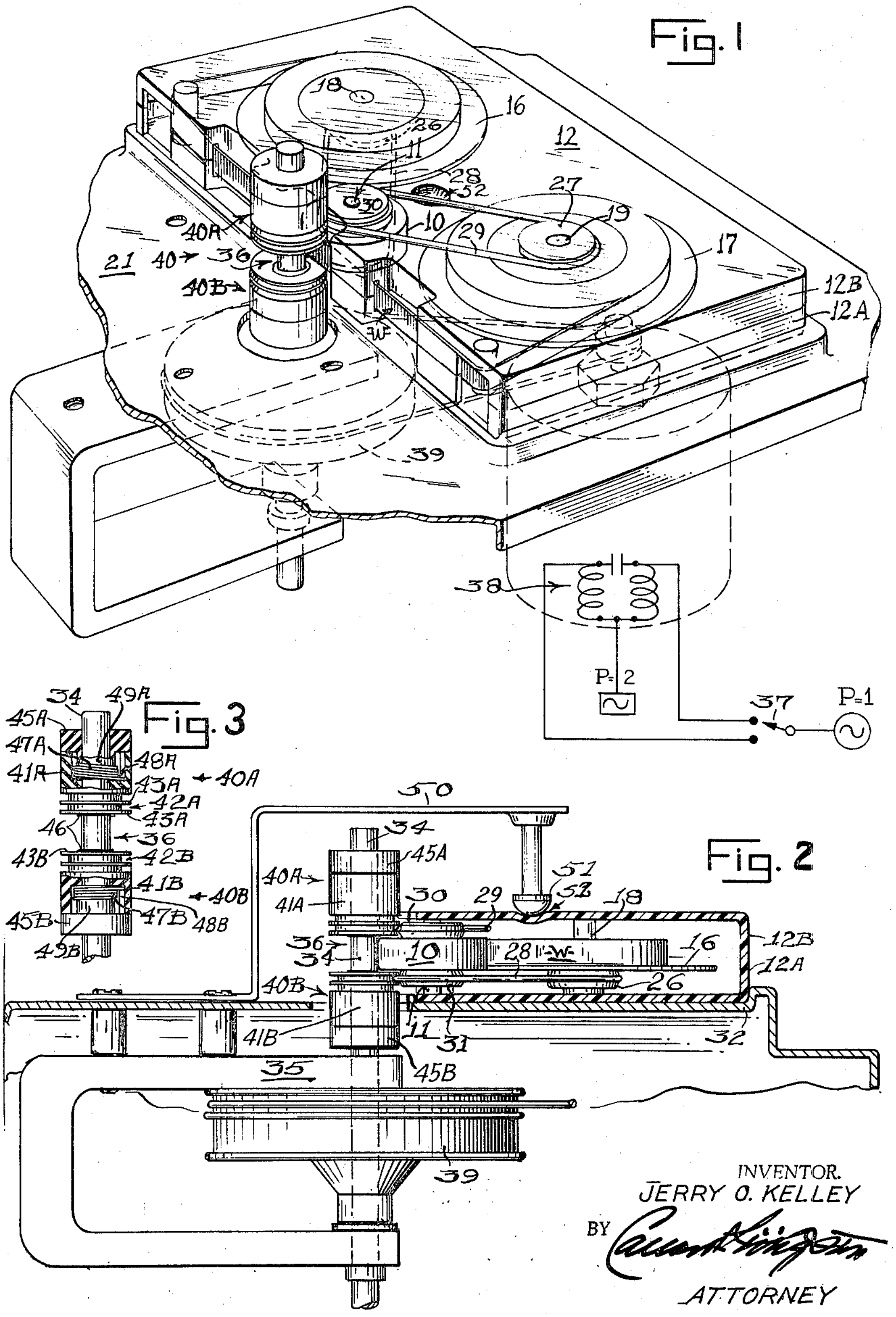
FIGURE 1 is a perspective view of the capstan complex and a cooperative cartridge with portions of a sound deck shown fragmentally.
FIGURE 2 is a vertical cross-section of apparatus such as shown in FIGURE 1.
FIGURE 3 is a vertical section of the capstan complex.
Figure 5:
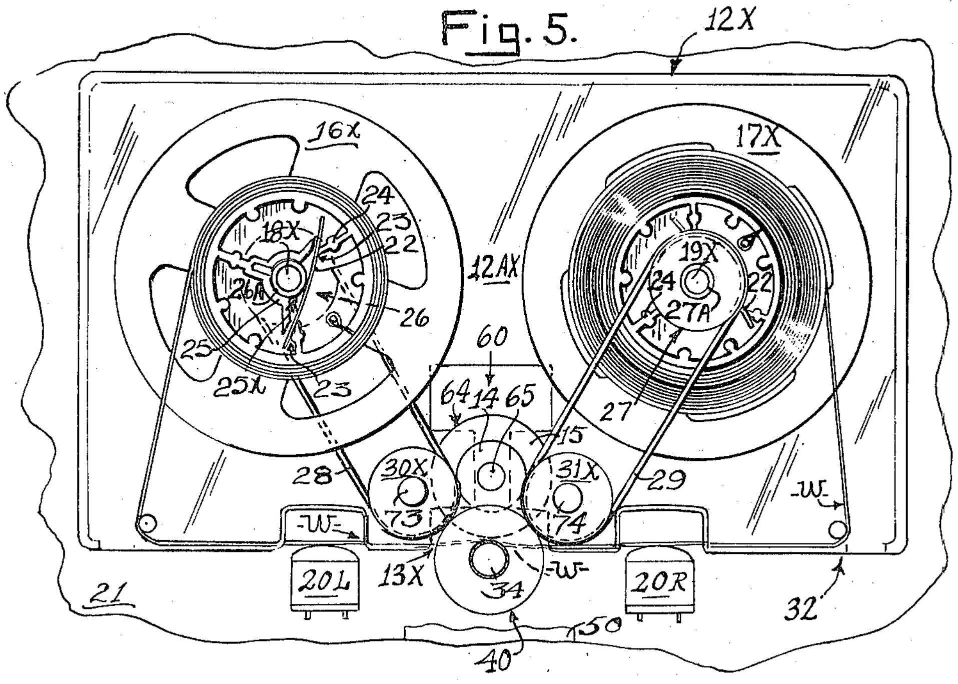
FIGURE 5 is a top plan view of a modified form of cartridge engaged with the capstan means in association with a modified form of sound deck, portions of which are shown fragmentally.

In the form of the apparatus depicted in FIGURE 1, the capstan unit 40 is arranged on a sound deck 21 for co-operation with a cartridge 12 having a pinch roller 10 included as a part thereof and rotating about a spindle stud 11 molded as an integral part of the bottom section 12A of the cartridge casing, this roller (FIGURE 5) consisting commonly of a rigid hub portion 14 fitted with a moderately resilient tire or rim 15 adapted to press the tape web W against the capstan spindle and rotate with the latter, thereby exerting a pull which unwinds the tape from one of the reels 16 or 17 depending upon the direction of rotation of the capstan, it being necessary to drive the companion reel positively in order to reel in the web after it passes over one of the sound heads 20L or 20R, FIGURE 5.

Figures 4, 6, 7:
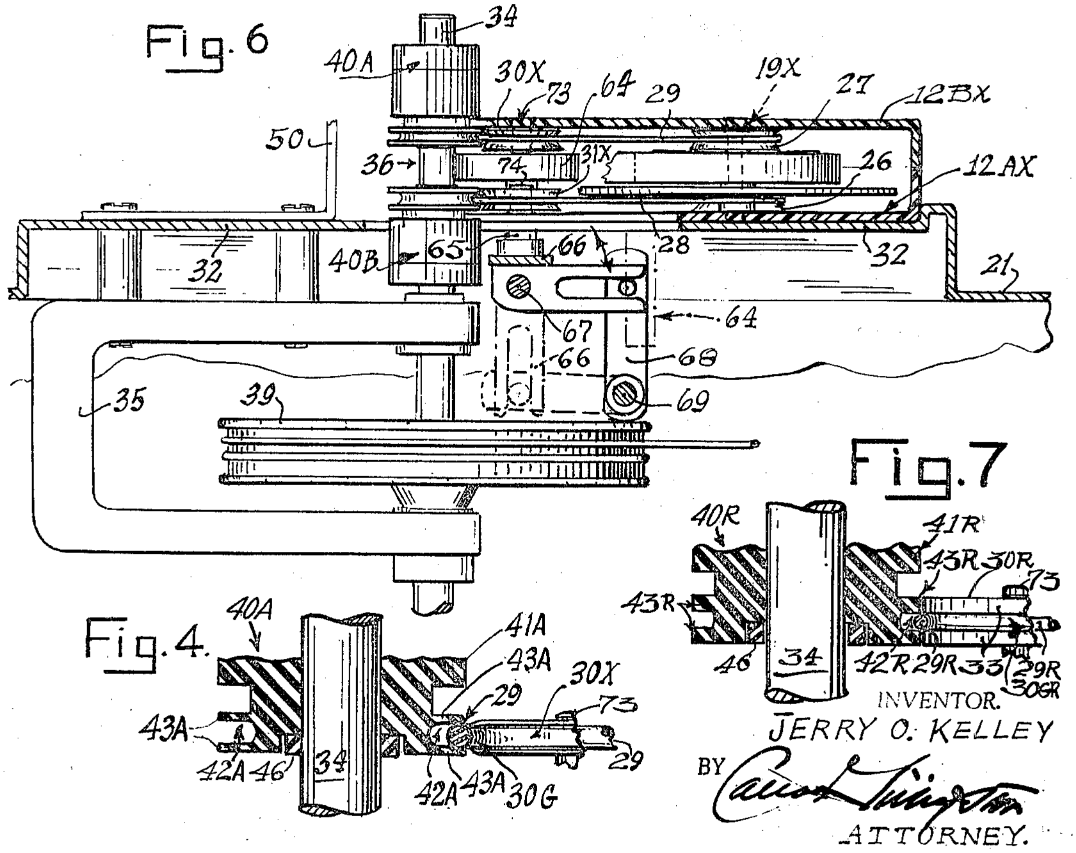
FIGURE 4 is a magnified fragmentary detail illustrative of the driving engagement between a capstan rotor sheave and a corresponding reel-driving pulley rotor by peripheral interengagement.
FIGURE 6 is a vertical cross-section of the modified form of the apparatus shown in FIGURE 5.
FIGURE 7 is a view similar to that of FIGURE 4 showing the capstan and reel rotors modified to drive in rim-to-rim tangential engagement.

The tape reels disclosed in FIGURES 1 and 5 are identical and rotate about corresponding fixed spindles 18, 19, (or 18X, 19X) which also are molded as parts of the bottom of the cartridge casing, as seen to advantage in FIGURE 6, each reel unit being of a type disclosed in the aforesaid Patent 3,348,786, and provided with a driven reel pulley 26 or 27 having a tubular spindle portion 26A or 27A adapted to fit freely onto one of said spindles 18 or 19, each reel being yieldingly coupled to the corrsponding pulley hub by a slip-coupling means in the form of a long blade spring 22 sprung in opposite slots 23 formed in consecutive radial hub ribs 24 molded with the reel structure to radiate from a central sleeve hub 25 therein, a sidewall portion 25X of this hub being cut away to expose the periphery of the appertaining pulley hub. Each blade spring is so biased in the seating slots aforesaid as to exert considerable friction against the exposed portion of the pulley whereby to couple the reel yieldingly to the pulley with sufficient force to exert a winding pull on the tape when the appertaining reel pulley 26 or 27 is driven, as by a corresponding pulley belt 28 or 29 trained over one of the pair of driving rotors or reel pulleys 30 or 31 coaxially but freely rotatable with the pinch roller on the spindle 11, FIGURE 2.

A feature of the foregoing arrangement is the omission from the cartridge of all clutch or like coupling means acting between the reel-driving pulleys 30, 31 and the pinch roller, it being the function of the capstan complex to drive one or the other of these driving pulleys for the reels selectively, depending upon the direction of rotation of a capstan spindle 34, FIGURES 1 and 2, journalled in a bearing bracket 35 forming part of the transducing unit, which includes a reversible motor 38 driving a flywheel 39 fixed on said spindle below the deck 21.

Means forming part of the capstan complex for selectively imparting torque to the reel-driving rotors or pulleys comprises a pair of capstan rotors in the form of sheaves 40A and 40B of identical construction spaced apart, as in FIGURES 1, 2 and 3, along the length of the capstan spindle to provide an intervening gap 36 sufficiently long to permit entry of the pinch roller 10 for driving engagement with the exposed portion of the spindle.

Each rotor or sheave unit 40A, 40B comprises, taking for example the upper units 40A, a first cylindrical body portion 41A, FIGURE 3, which may be molded from one of the synthetic plastic materials, such as nylon, and which has formed therein a bore and a circumambient sheave groove 42A flanked by a pair of thin-webbed flanges 43A having some yieldability at least near their peripheral margins for the purpose of fitting snuggly onto peripheral salient portions of a corresponding one of the pulley belts 28, 29, which will be juxtaposed therewith when the cartridge is seated in operative position on the sound deck 21, each of the driving rotors or pulleys 30, 31 on the pinch roller spindle being formed with a shallow belt groove 30G, FIGURE 4, just sufficiently deep to retain the belt securely while rendering the same salient for exposure of a maximum portion of the body thereof, as it turns about the pulley for purposes of driving engagement as aforesaid by the correspondingly salient flange portions 43A aforesaid in the capstan sheave.

Directionally-responsive clutch means is contained within the capstan structure for selectively driving each of the sheave rotors dependently upon the direction of rotation of the capstan spindle, and comprises, as seen in FIGURE 3, a second or complementary body portion and hub member 45A or 45B which may be force-fitted or otherwise fixed on the capstan spindle so as to rotate at all times therewith and also to serve as a closure for the cavity of the companion body portion 41A in which is contained a clutch means cooperable with the appertaining hub member 45A and preferably taking the form of a helical spring 47A having one end fixed as in a notch 48A in the first body member with a number of turns of the helix closely embracing the cylindrical periphery 49A of the second or hub member 45A such that when the latter turns in the proper direction with the spindle the coils of the helix tighten thereabout coupling the two elements 40A, 45A with resultant positive rotation of the appertaining rotor means and consequent rotation of the corresponding reel-driving pulley 30, for example. The helix of the clutch spring 47B in the companion sheave unit performs identically but in the reverse direction of rotation of the spindle to drive the other reel-driving rotor 31.

The respective body portions 41A, 41B may be spaced apart on the spindle by any means such as a force-fitted stop collar 46 received in an endwise bore at the juxtaposed ends thereof.

The corresponding force-fitted hub members 45A, 45B at the opposite ends of these members serve to capture the rotor structures on the spindle to define and maintain the required pinch roller-entry gap 36.

Thus, mere reversal of the motor means 38, as by operation of a switch 37, FIGURE 1, will effect the appropriate directional rotation of the pinch roller and that one of the reels which is required to spool in or take up the unwinding tape web, which is intentionally not permitted to run wholly free from the payout reel owing to tension maintained on its drive belt and a moderate braking effect reflected from the non-driven rotation of the corresponding drive pulley on the pinch-roller spindle 11 and the non-driven rotation of the idle capstan sheave relative to the capstan spindle, such braking action serving to maintain a sufficient tension on the "free" or payout reel and outgoing web to prevent overrunning and spin-out of the tape as it advances toward the capstan spindle.

In a modified form of the apparatus, as illustrated in FIGURES 5 and 6, the built-in pinch roller 10 and its corresponding spindle 11 are omitted and a large T-shaped passage slot 60 is provided in the floor of the bottom cartridge section 12AX opposite the central cartridge window 13X which confronts the capstan structure 40 whereby to permit entry of an external pinch roller 64, FIGURE 6, forming a part of the transducing unit and rotatable on a spindle 65 carried by a bracket 66 having pivotal support as to 67 beneath the deck 21 thereof.

The bracket 66 is pivotable by a crank means 68 turned about the axis of a shaft 69 so as to pivot from the full-line operative position entered into the cartridge, to the lowered and withdrawn position shown in dashed lines.

As viewed in FIGURE 5, the two reel-driving pulleys 30X, 31X rotate about separate spindles 73 and 74, the former of which, FIGURE 6, is molded as a part of the top section 12BX of the casing while the other is molded as a part of the bottom section 12AX, the respective axes of these spaced spindles being on a common arc radial to the axis of the capstan spindle 34, with each spindle angularly offset from the other on respectively opposite sides of a radius extending from the axis of the capstan spindle through the axis of the pinch roller (elevated to operative position) and a continuation of this line centrally through the roller slot 60, in such manner that each of the offset reel-driving rotors is disposed radially of a corresponding one of the capstan rotors for driving contact therewith on placement of the cartridge in operative position with room in between to permit the external pinch roller to swing into engagement with the tape as it passes across the window 13X, and thence against the capstan spindle 34.

The sound deck 21, FIGURE 2, is provided with an elevated bed or seating formation 32 receiving the cartridge and disposing it for proper alignment of the tape and pinch roller with the exposed driving portion of the capstan spindle; and means is further provided for securing the cartridge in this seat, and may take the form of a springy overhead arm 50 fitted with a pendant detent 51 engaging in a depression 52 in the top of the cartridge.

It will be seen that the two forms of the cartridges shown in FIGURES 1 and 5 are similar in the respect that both utilize the blade-spring reel coupling means 22–25 and the flange-driving coaction between the capstan sheaves and reel driving belts; while they differ essentially in that the embodiment of FIGURE 1 includes a permanent pinch roller with which both reel-driving pulleys are freely and coaxially journalled on a single spindle, whereas the cartridge of FIGURE 5 contains no pinch roller as a fixed part thereof, but admits an external pinch roller and for this purpose utilizes separate offset spindles to space the two reel-driving pulleys for admission of the pinch roller in its movement into operative position, the construction of the capstan complex being unchanged for coaction with either form of the cartridge, however, the cartridge of FIGURES 5 and 6 being still more economical to manufacture by reason of the deduction of costs resulting from the omission of the pinch roller altogether.

The capstan drive for teh reel pulleys thus far described is characterized for convenience as a "peripheral" drive in that it depends upon the disposition of a pulley belt 29, as in FIGURE 4, in a shallow pulley wheel groove 30G so that the portion of the belt exposed to the thin-webbed capstan sheave flanges 43A will present a maximum salient area of the belt at this point for driving seizure between such flanges in a sort of a wedging action, and for such purposes the pulley belts preferably will have a circular cross-section and be fabricated from a rubber-like material affording good frictional engagement with the material of the capstan sheave formations 42A, 43A, standard O rings of neoprene or the like purchased on the open market being found suitable for use with nylon capstan sheaves, for example.

A modified form of capstan-to-pulley interdrive is illustrated in FIGURE 7, wherein the reel drive pulleys, such as 30R, instead of having a shallow belt groove 30G, are provided with a pair of wide-faced rims 33 flanking the belt groove, and the capstan sheave 41R has correspondingly disposed and wide rims 43R for confronting driving engagement with the pulley rims 33, such rim-to-rim driving engagement constituting the principal driving intercoupling between the capstan and the cartridge reel pulleys. In this form of the device, the pulley belt 29R may be only incidentally engaged by the wide-faced capstan rims 43R; or the belt may not be engaged in a perpiheral driving sense at all, but may be of a cross-sectional diameter, or the pulley groove 30GR may be deep enough, to prevent any driving contact whatever of the belt by the capstan driving sheave or wheel. In this form of drive, the reel pulleys 30R and their cooperative counterparts will preferably be formed of a resilient material, such as rubber or equivalent synthetics, similar to those employable for the pinch roller rim or tire 15, to afford good frictional interengagement with the rim portions 43R of the capstan unit.

Thus, it is seen that the disclosed method and implementing apparatus afford a means for driving not only the pinch roller, but one or the other of the take-up reels in directional alternation by peripheral confrontation and driving engagement of driving rotors which are coaxially assembled as parts of a composite capstan spindle structure, on the one hand, and driven reel rotors which are parts of the reeling assembly in the cartridge, on the other hand, whereby it is possible to employ but a single reverse-acting clutch mechanism incorporated also as an internal component of the capstan complex, with the consequence that it is no longer necessary to include any clutching mechanism in each cartridge.

Moreover, the cramped space conditions existing within the compact types of tape cartridge have required that any directionally-selective clutch means employed therein, for instance in coaxial embodiment with the pinch roller, must be of maximal efficiency and reliability while the construction thereof must be of very nearly miniaturized dimensional character, whereas in the disclosed constructions there are no comparable spatial and dimensional limitations to limit the size and efficiency of the clutch means, other than the requirement that the diametric and positional parameters for the rotor members 40A, 40B shall be such as to permit contacting the corresponding reel-driving rotors 30, 31 or their variants, in the requisite peripheral-driving confrontation and engagement.

In the cartridge-enclosed reeling assembly of FIGURE 1, the reel-pulley rotors 30, 31 are mounted in a monaxial cluster to to rotate about the single spindle post 11, and the smaller diameter of the capstan spindle portion 34 recessed in gap 36 admits a large-diameter pinch roller 10 while the flanking larger-diameter rotors 40A, 40B approach the cartridge in proximity to engage with the reel rotors 30, 31 in the monaxial cluster of FIGURE 1 as well as in the dispersed multiaxial clustering of their counterparts 30X, 31X in the arrangement of FIGURE 5. Such relative diametric parameters are empirical in the sense that they depend in part upon the proximity of the rotative axis or axes of the reel pulleys or rotors 30, 30X and 31, 31X and the axis of the pinch roller to the wall margins of a cartridge casing having a rectangular configuration such as shown; but since it is desirable in general to employ a pinch roller of large diameter, and preferably of substantially larger diameter than the spindle against which the tape is to be pressed, the gapped configuration of the capstan complex is desirable in that it permits use of a large pinch roller and the placement of the rotors 30, 31 at upper and lower levels without resort to unusual configurations in the cartridge, whether the monaxial or the dispersed-axis clustering arrangements is employed.

I claim:

1. Sound tape apparatus comprising, in combination, capstan means and tape reeling means including a pair of tape reels and a pinch roller and means supporting the same for rotation in cooperation with said capstan means to travel a tape web reversely from either reel to the other, said reeling means further including a pair of reel rotors and means drivingly interconnecting each rotor of the pair with a corresponding one of said reels for rotation of the latter responsive to rotation of the appertaining reel rotor, each reel rotor having radially-disposed peripheral drive means exposed for driving contact with cooperative peripheral drive means on the corresponding capstan rotor in a predetermined operative juxtapositioning of the reeling and capstan means, said capstan means having the form of a coaxial rotary system comprising a capstan complex including in assembly a reversely rotatable capstan spindle having an exposed peripheral capstan area for driving engagement with the pinch roller and tape thereon, together with a pair of capstan rotors each mutually reversely unidirectionally driven with respect to the other and relatively independently rotatable about the rotative axis of the capstan spindle and situated in close adjacency thereto; means included as part of said rotary assembly operative automatically to couple a different one of said capstan rotors with the capstan spindle for positive driving rotation by such spindle in each of the opposite directions of rotation thereof, each capstan rotor having peripheral-drive means disposed about its periphery radially of its axis of rotation and of a character and in positions respectively to drivingly engage with the peripheral drive means of a corresponding one of said reel rotors in the operative juxtapositioning of the capstan and reeling means aforesaid; and means structurally associated with said supporting means positioning said pinch roller and the tape web engaged thereby against said capstan area of the spindle when the reeling means is disposed in the aforesaid juxtaposed condition whereby to drive the pinch roller and tape and effect positive rotation of one or the other of said capstan rotors and the corresponding reel rotor and reel responsive to rotation of the capstan spindle in one or the other direction.

2. Sound tape apparatus according to claim 1 wherein said means drivingly interconnecting the reels with their respective rotors comprises a pulley belt and the reel rotors are pulley wheels each driving its corresponding reel through a said pulley belt trained thereover in such manner that an outer peripheral portion of the belt projects in radially salient exposure therefrom in the region of a turn of the belt thereover which is located in driving confrontation with the peripheral drive means of the corresponding capstan rotor, said outer peripheral portions of the respective belts constitute the respective peripheral drive means of the reel rotors aforesaid, and the peripheral drive means of each of said capstan rotors comprises spaced circumambient flange means defining a circumferential belt groove thereabout which engages drivingly with said radially-salient belt portion on the corresponding one of said pulley wheels in the juxtaposed operative position aforesaid.

3. Sound tape apparatus according to claim 1 wherein the peripheral drive means of the rotors is characterized in that each rotor has extending circumferentially thereabout a continuous rim having a peripheral driving surface of a character and in a position to drivingly engage with a like driving surface provided on the confronting rim of the corresponding rotor in the operative juxtaposition aforesaid.

4. Sound tape apparatus according to claim 1 wherein said supporting means comprises a cartridge casing substantially enclosing said reels and the appertaining reel rotors comprising the reeling assembly, said casing having formations to expose portions of the tape web for driving engagement with the capstan spindle by the pinch roller, as aforesaid, and also to expose portions of said reel rotors for peripheral driving engagement as aforesaid with the rotors of the capstan complex.

5. Sound tape apparatus according to claim 1 wherein the reel rotors and pinch roller are journalled in close adjacency as a cluster to rotate about the same axis.

6. Sound tape apparatus according to claim 1 wherein the reel rotors and pinch roller are journalled on separate spindles in close proximity to rotate about separate axes all in parallelism and radial alignment with the axis of the spindle means in the operative juxaposition aforesaid.

7. Sound tape apparatus according to claim 4 wherein said casing comprises mating sections and said pinch roller and reel rotors are journalled for operation as aforesaid upon a single spindle affixed to one of said sections.

8. Sound tape apparatus according to claim 4 wherein said casing comprises two members in assembly and each reel rotor is journalled for operation, as aforesaid, upon a spindle carried by a different one of said members.

9. Sound tape apparatus according to claim 8 wherein the pinch roller is journalled on movable spindle means which is external to the cartridge casing and the casing is provided with passage means through which the pinch roller is moved for positioning in the operative juxtaposition aforesaid.

10. Sound tape apparatus according to claim 1 wherein said capstan rotors are disposed on the spindle means in mutually spaced-apart relation along the axis thereof each at one of the axial end regions of said capstan spindle area, and the diameter of the capstan spindle in said area is substantially less than the diameter of said capstan rotors such that the peripheral tape-engaging surface of the capstan spindle is recessed in an annular gap defined between said spaced-apart rotors said gap being of a dimension to admit the pinch roller and tape to peripheral driving engagement with the spindle area, said pinch roller and the reel rotors having diametric parameters, and their respective axes of rotation being so located relative to the axis of the spindle means, that in the said operative juxtaposition of the capstan complex and tape reeling assembly the pinch roller enters said gap and drivingly engages the spindle area with the tape web and each of said reel rotors is disposed in driving engagement with a corresponding capstan rotor.

11. In tape-reeling apparatus of a type for use with a composite monaxial capstan assembly which includes coaxially revoluble peripheral-driving capstan rotors and capstan spindle means, the combination, with a pair of tape reels journalled in a cartridge casing, of: a pair of peripherally-driven reel rotors journalled within the casing and each having driving connection with one of said reels, said reel rotors having a peripheral drive portion thereof exposed from the casing in a spatial relationship to the like exposed peripheral drive portion of the other reel rotor for driving confrontation and engagement of said respective exposed portions with cooperative peripheral-drive portions of corresponding ones of said capstan rotors in a predetermined operative juxtapositioning of the cartridge casing with said composite capstan assembly, together with a pinch roller journalled in said casing in such close proximity and axial orientation with respect to both reel rotors and the axis of rotation of the capstan assembly as to press a portion of the tape web reeled between said reels drivingly against said capstan spindle in the operative juxtapositioning aforesaid.

12. For use with a reel-to-reel type of sound tape cartridge of the type having tape reels journalled therein for reeling a tape web over a pinch roller, and each driven by a reel rotor having peripheral drive portions exposed to driving confrontation and engagement with corresponding peripheral-drive rotors coaxially revoluble about a common axis with a capstan spindle engaging the tape web and pinch roller, a composite capstan drive unit comprising: in unitary assembly with a reversely rotatable capstan spindle, a pair of peripheral drive rotors revoluble coaxially of said spindle and each directionally coupled for rotation therewith by unidirectionally acting coupling means forming part of the drive unit and respectively operative each in one of the opposite directions of rotation of the capstan spindle to couple a corresponding capstan rotor for rotation therewith, each said capstan rotor having circumambient peripheral drive means extending thereabout radially of its axis of rotation and adapted and positioned for driving confrontation and engagement respectively with cooperative peripheral drive means on corresponding reel rotors in a tape cartridge disposing the same in operative juxtaposition with the drive unit as aforesaid, said capstan spindle having a portion exposed for driving engagement with a pinch roller and tape web trained thereover from said reels.

13. The method of reversely travelling sound tape from one to another of a pair of reels revoluble about parallel axes by pressing the tape between a pinch roller and a capstan spindle both revoluble about axes parallel to the reel axes and cooperatively acting to pull the tape from one reel while the other reel is positively driven to wind in the tape for take-up action in correspondence with the direction of rotation of the capstan spindle, which method comprises: driving each reel by a corresponding reel rotor which is revoluble about an axis parallel to the reel and capstan axes; positively driving the reel rotors each only in a different one of the opposite directions of rotation of the capstan spindle through the agency of a pair of capstan rotors carried by the capstan spinde and comprising with the spindle part of a capstan complex and adapted for driven rotation coaxially thereof; driving each capstan rotor positively only in one of the opposite directions of rotation of the capstan spindle which is different from the direction of driven rotation of the other capstan rotor by said spindle, such driving being effected through the agency of oppositely-acting unidirectional clutch means forming part of said complex and respectively interacting between each capstan rotor and the capstan spindle as aforesaid; and effecting a peripheral interdriving action between a member on each capstan rotor and a member on the corresponding reel rotor with concomitant driving interengagement between the pinch roller and the capstan spindle and the tape web pressed therebetween as the result of a cooperative juxtapositioning of the reels, pinch roller and reel rotors constituting a reel assembly as one group, and the capstan spindle and capstan rotors and clutch means constituting the capstan complex as another group.

14. A method according to claim 13 further characterized by rotating the pinch roller and reel rotors about the same axis.

15. A method according to claim 13 further characterized by rotating the pinch roller and reel rotors about different axes.

16. The method of claim 13 further characterized by forcibly contacting the rim of one rotor with the rim of another and effecting peripheral driving interengagement therebetween as aforesaid.

17. The method of claim 13 further characterized in that the peripheral interdriving of capstan and reel rotors as aforesaid is effected by training corresponding pulley belts over respective reel rotors with a portion of each belt exposed saliently from its pulley rotor while urging said capstan and reel rotors radially together and pressing the respective salient portions of the pulley belts into a peripheral driving groove in the appertaining capstan rotor.

18. In a method according to claim 13, further disposing the capstan complex, including the capstan spindle and capstan rotors, operatively on a first support, and disposing the reeling assembly, including the tape reels and reel rotors, operatively on a second support, and moving one said support relative to the other and thereby disposing the reel assembly in, or withdrawing it from, operative juxtaposition as aforesaid.

19. The method according to claim 13 further characterized by operatively disposing the capstan complex, including capstan spindle and capstan rotors, on a first support, and operatively disposing the reeling assembly, including the tape reels and reel rotors, on a second support, and moving said supports one relative to the other thereby locating said assemblies in, or separating them from, the condition of operative juxtaposition aforesaid, and rotating the pinch roller in position on one of said supports in operative engagement with the tape web and capstan spindle in consequence of operative juxtapositioning of the assemblies as aforesaid.

20. In the method of claim 13, the further step of disposing the capstan assembly, including the capstan spindle and capstan rotors, on a first movable supporting means, and confining the reeling assembly, including the tape reels and reel rotors, in a second movable supporting means comprising an encasement, exposing for access exteriorly of the encasement a portion of the tape web and peripheral drive portions of the reel rotors from the encasement, and positioning the movable supporting encasement on said first supporting means thereby disposing said capstan and reeling assemblies in operative juxtaposition as aforesaid, and disposing the pinch roller substantially within said encasement to engage said exposed portion of the tape web in consequence of relative movement of the said first and second supporting means into operative juxtaposition as aforesaid.

21. The method of claim 20 further characterized by fixing the location of the pinch roller on a spindle within the encasement.

22. The method of claim 20 further characterized by locating the pinch roller shiftably on the first supporting means and entering the pinch roller into the encasement through an opening therein resultantly upon relative juxtapositioning of the first and second supporting means as aforesaid, and shifting the pinch roller to and from positions to press said exposed portion of the tape against the capstan spindle as the consequence of moving the said supporting means relatively into and from said juxtaposed relationship.

References Cited

UNITED STATES PATENTS 3,348,786 10/1947 Miller et al. ------ 242—55.13

FOREIGN PATENTS 959,873 10/1949 France.
1,133,313 3/1957 France.
800,638 8/1958 Great Britain.

GEORGE F. MAUTZ, Primary Examiner

U.S. Cl. X.R.

226—188